US008253944B2

(12) United States Patent
Trinkle et al.

(10) Patent No.: US 8,253,944 B2
(45) Date of Patent: Aug. 28, 2012

(54) ALTERNATE MODULATION SCHEME FOR AN INTERFEROMETRIC FIBER OPTIC GYROSCOPE

(75) Inventors: William Joseph Trinkle, Tampa, FL (US); Ernest Frank John Graetz, Largo, FL (US); Kirby Kueber, Clearwater, FL (US)

(73) Assignee: Honeywell International Inc., Morristown, NJ (US)

( * ) Notice: Subject to any disclaimer, the term of this patent is extended or adjusted under 35 U.S.C. 154(b) by 484 days.

(21) Appl. No.: 12/505,718

(22) Filed: Jul. 20, 2009

(65) Prior Publication Data

US 2011/0013194 A1 Jan. 20, 2011

(51) Int. Cl.
G01C 19/72 (2006.01)

(52) U.S. Cl. .......................................... 356/460

(58) Field of Classification Search .................. 356/460, 356/464; 250/227.19, 227.27; 385/12
See application file for complete search history.

(56) References Cited

U.S. PATENT DOCUMENTS

| 6,046,810 | A  | 4/2000 | Sanders et al. |
| 7,167,250 | B2 | 1/2007 | Chen et al. |

Primary Examiner — Hwa Lee
(74) Attorney, Agent, or Firm — Fogg & Powers LLC

(57) ABSTRACT

An Interferometric Fiber Optic Gyro (IFOG) device for high accuracy sensing. An example IFOG includes an integrated optics chip (IOC) and a modulation component that modulates one or more light signals passing thru the IOC according to a bias-modulation waveform. A glitch pattern experienced at front-end components of the IFOG includes frequency content that has approximately zero amplitude at predefined sense harmonics. Frequency content of the bias-modulation waveform is below a predefined threshold value at the predefined sense harmonics.

10 Claims, 6 Drawing Sheets

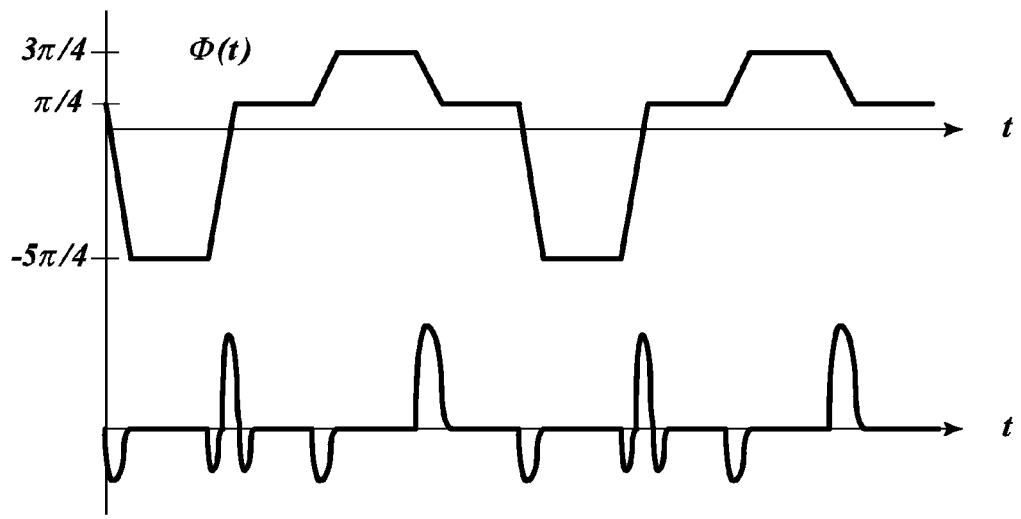
FIG.2-1 *(PRIOR ART)*
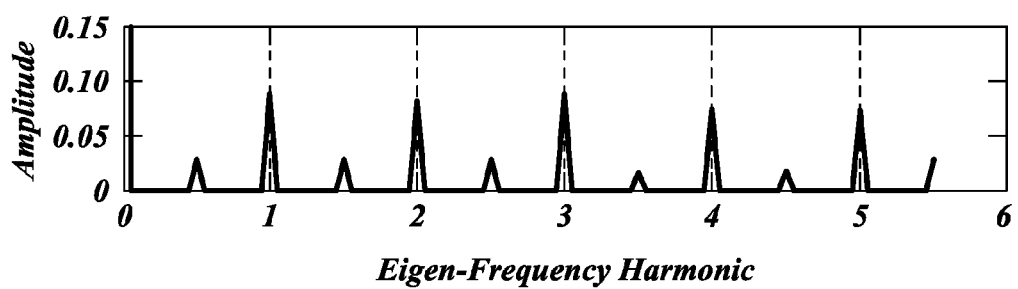
FIG.2-2 *(PRIOR ART)*

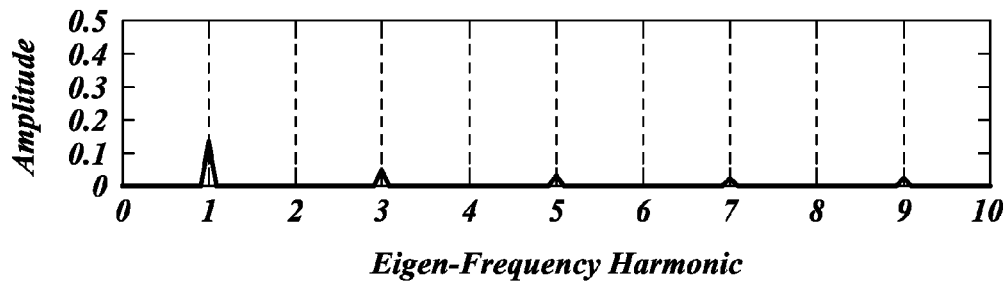
FIG.5-1 *(PRIOR ART)*
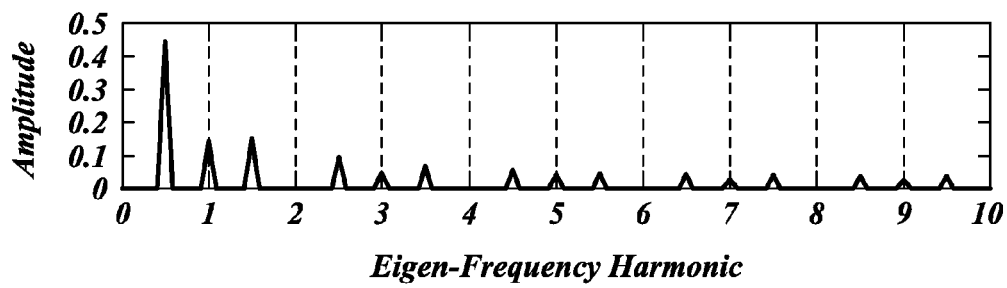
FIG.5-2 *(PRIOR ART)*
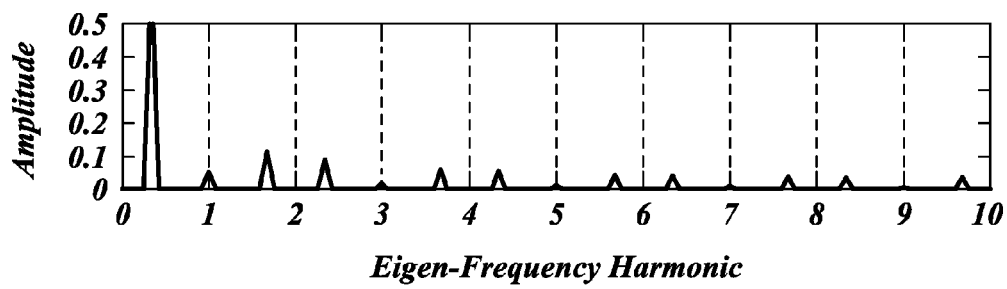
FIG.5-3

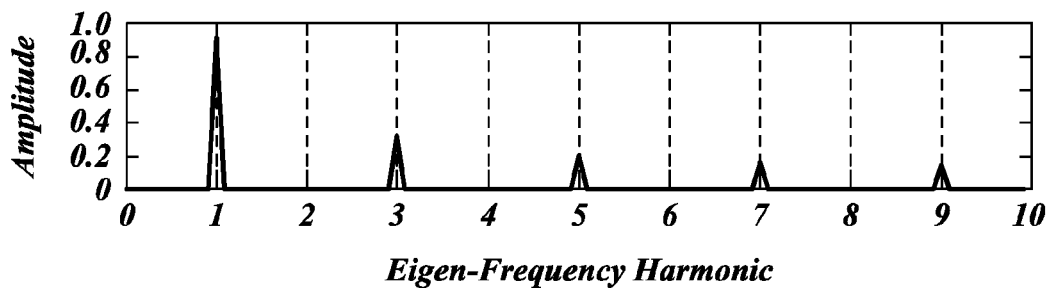
FIG. 6-1 *(PRIOR ART)*
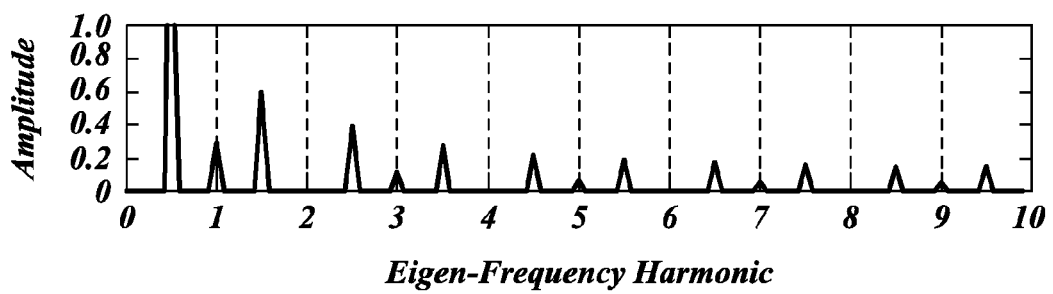
FIG. 6-2 *(PRIOR ART)*
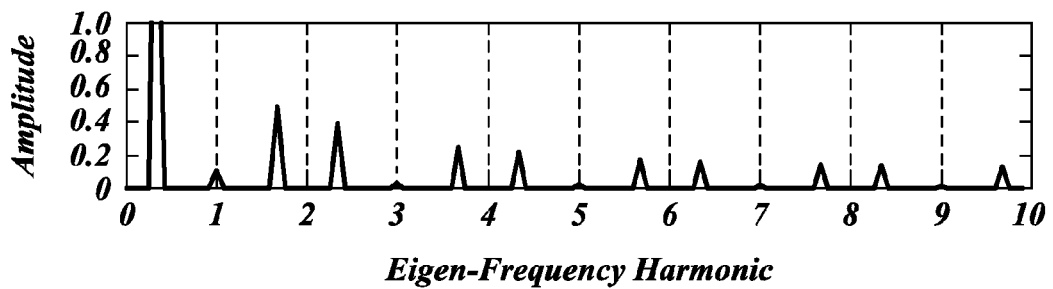
FIG. 6-3

ALTERNATE MODULATION SCHEME FOR AN INTERFEROMETRIC FIBER OPTIC GYROSCOPE

BACKGROUND OF THE INVENTION

Generally, one of two modulation schemes is used for high accuracy Interferometric Fiber Optic Gyroscope (IFOG): Square-wave modulation or Dual Ramp modulation. Dual Ramp modulation allows the $V_{pi}$ value of an Integrated Optics Chip (IOC) of the IFOG to be servoed, which provides a highly accurate scale factor. The expense of this modulation scheme is that it produces a glitch pattern at the front-end that has Eigen-frequency first harmonic content. This has the undesirable effect of introducing additional bias into the IFOG. The Square-wave modulation scheme provides a benign glitch pattern at the front-end containing primarily Eigen-frequency second harmonic content, which the IFOG is immune to. However, the Square-wave modulation does not provide a means for servoing $V_{pi}$.

FIGS. 1-1 and 2-1 are plots of two prior art bias modulation waveforms and their resulting glitch patterns. These bias modulation waveforms are currently used in high precision IFOG applications.

FIGS. 1-2 and 2-2 illustrate frequency content of the glitch patterns shown in FIGS. 1-1 and 2-1. The Square-wave modulation glitch pattern does not have any frequency spikes at the odd Eigen-frequency harmonics and, therefore, will (ideally) contribute no bias due to glitch pick-up during Front-End sampling. The Dual Ramp modulation glitch pattern shows substantial odd harmonic content and will contribute significant bias error in the absence of adequate glitch masking.

Another advantage of Dual Ramp modulation over Square-wave modulation is the decrease in Eigen-frequency content over the IOC drive waveform when certain modulation depths are used. Two commonly used modulation depths were investigated here ($\pi/2$ and $3\pi/4$). FIGS. 5-1, 5-2, 6-1, and 6-2 show the frequency content for $\pi/2$ and $3\pi/4$ modulation depths, respectively. As shown in FIGS. 5-1 and 5-2, at $\pi/2$ modulation depth the Dual Ramp modulation waveform has the same 1st harmonic Eigen-frequency content as Square-wave modulation. As shown in FIGS. 6-1 and 6-2, the Dual Ramp modulation waveform now has three times less first harmonic Eigen-frequency content than the Square-wave modulation. But the present invention has nine times lower signal level than the Square-wave modulation. These results show that the modulation scheme of the present invention is more favorable than both Square-wave and Dual Ramp modulation, from the perspective of electrical coupling between the IOC drive and Front-End electronics.

SUMMARY OF THE INVENTION

The present invention provides a modulation scheme for high accuracy Interferometric Fiber Optic Gyroscopes (IFOG) that produces a benign Front-End glitch pattern like Square-wave modulation, while maintaining the benefits of Dual Ramp modulation.

An Interferometric Fiber Optic Gyro (IFOG) device for high accuracy sensing. An example IFOG includes an integrated optics chip (IOC) and a modulation component that modulates one or more light signals passing thru the IOC according to a bias-modulation waveform. A glitch pattern experienced at front-end components of the IFOG includes frequency content that has approximately zero amplitude at predefined sense harmonics. Frequency content of the bias-modulation waveform is below a predefined threshold value at the predefined sense harmonics.

The present invention makes the electrical isolation requirement less stringent, because the electrically coupled signal doesn't cause as much error.

BRIEF DESCRIPTION OF THE DRAWINGS

Preferred and alternative embodiments of the present invention are described in detail below with reference to the following drawings:

FIGS. 1-2 and 2-2 show frequency content of the glitch patterns shown in FIGS. 1-1 and 2-1;

FIG. 4-1 illustrates a modulation scheme and glitch pattern used by the IFOG of FIG. 3;

FIG. 4-2 is a harmonic plot of the glitch pattern shown in FIG. 4-1;

FIGS. 5-1, 5-2, 6-1, and 6-2 show frequency content for the prior art modulation schemes of FIGS. 1-1 and 2-1 at different bias-modulation depths; and FIGS. 5-3 and 6-3 show frequency content associated with the modulation scheme shown in FIG. 4-1 at different bias-modulation depths.

DETAILED DESCRIPTION OF THE INVENTION

Figure 3:
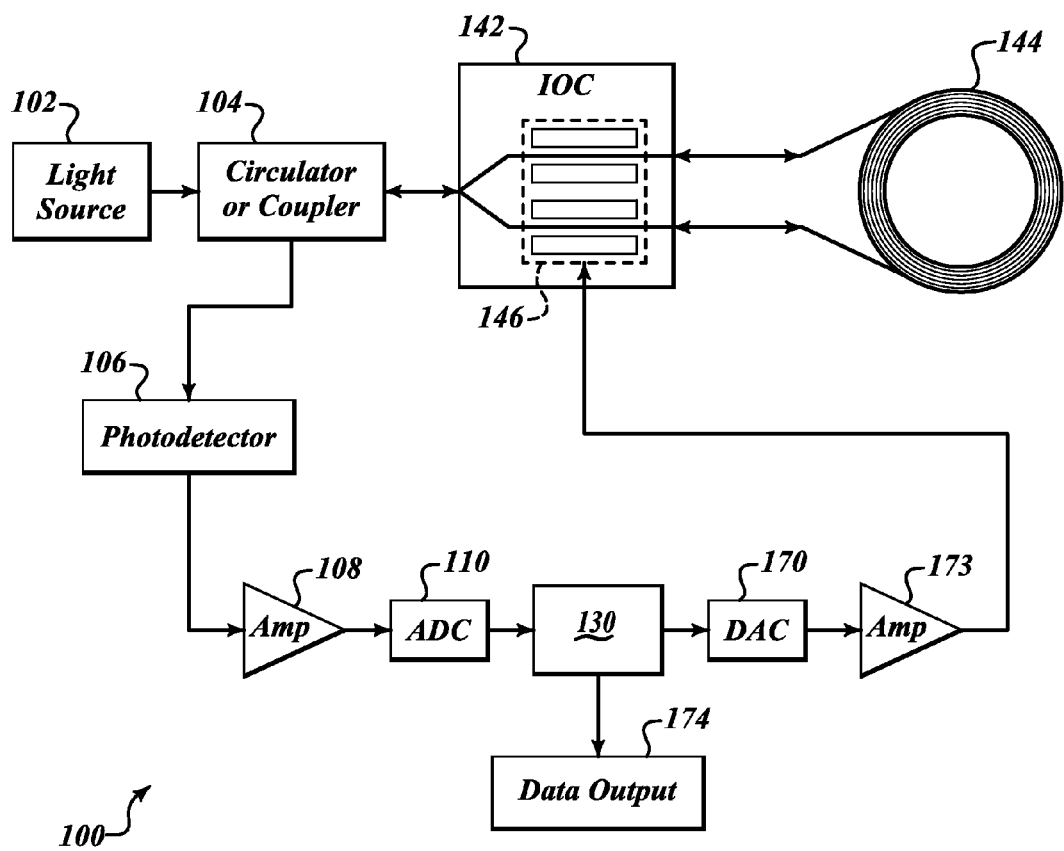
FIG. 3 is an Interferometric Fiber Optic Gyroscope (IFOG) formed in accordance with an embodiment of the present invention.

FIG. 3 illustrates an Interferometric Fiber Optic Gyroscope (IFOG) 100 that produces a benign glitch pattern at front-end electronics and has improved electrical isolation. The IFOG 100 includes a light source 102, a circulator/coupler 104, a photo detector 106, an amplifier 108, an analog-to-digital converter (ADC) 110, front-end electronics/modulation module 130, a digital-to-analog converter (DAC) 170, a second amplifier 173, and an integrated optics chip (IOC) 142 and a fiber optic loop 144. The light source 102 sends light waves to the circulator/coupler 104. The IOC 142 receives light waves from the circulator/coupler 104, modulates the light waves at a modular component 146 based on a modulation scheme generated by the front-end electronics/modulation module 130 via the DAC 170 and the second amplifier 173. The modulated light waves circulate in clockwise (CW) and counterclockwise (CCW) directions in the fiber optic loop 144. The CW and CCW light waves are returned from the fiber optic loop 144 to be combined by the IOC 142 then sent to the circulator/coupler 104. The combined CW and CCW light waves are passed by the circulator/coupler 104 to the photo detector 106 that generates a sensed voltage (or current) value. The sensed voltage (or current) value is amplified by the first amplifier 108, converted to a digital signal at the ADC 110 and sent to the front-end electronics/modulation module 130. The module 130 demodulates the digital signal, generates an output signal based on the demodulated signal, and generates a modulation signal based on the servoed $V_{pi}$ value and modulation depth. The modulation signal stays the same except that its amplitude changes as $V_{pi}$ changes.

The drive signal cancels the effect of angular rate and so it changes as the rate experienced by the gyroscope changes. The output signal is sent to a data output device 174.

The modulation scheme produced by the modulation module 130 provides a glitch pattern seen at the input of the modulation module 130 that is benign relative to the signal being detected. The glitch pattern is experienced at the output of the photodetector 106 and from there it propagates to the input of the ADC 110. In other words, the glitch pattern experienced at the front-end electronics/modulation module 130 has a harmonic content that is not in conflict with harmonic components of the light waves sensed by the photo detector 106. Also, the present modulation scheme allows modulation depth errors ($V_{pi}$) to be servoed which provides a highly accurate scale factor. $V_{pi}$ is the voltage required on the IOC modulation component to create a phase shift of $\pi$ radians (180°) between the two counter propagating light waves in the coil loop 144. The scale factor is the constant used to convert the measured signal received by the modulation module 130, from the ADC 110, into angle or rate.

Figure 1:
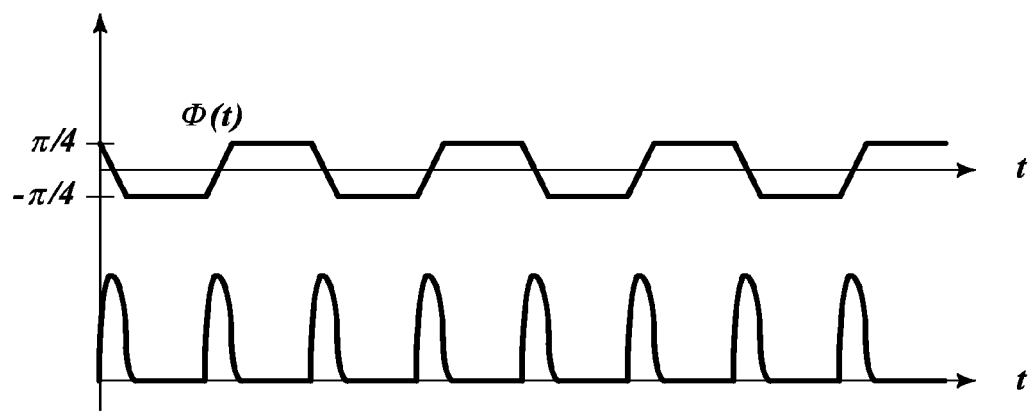
FIGS. 1-1 and 2-1 illustrate prior art modulation schemes and front-end glitch patterns.
Figures 1, 4:
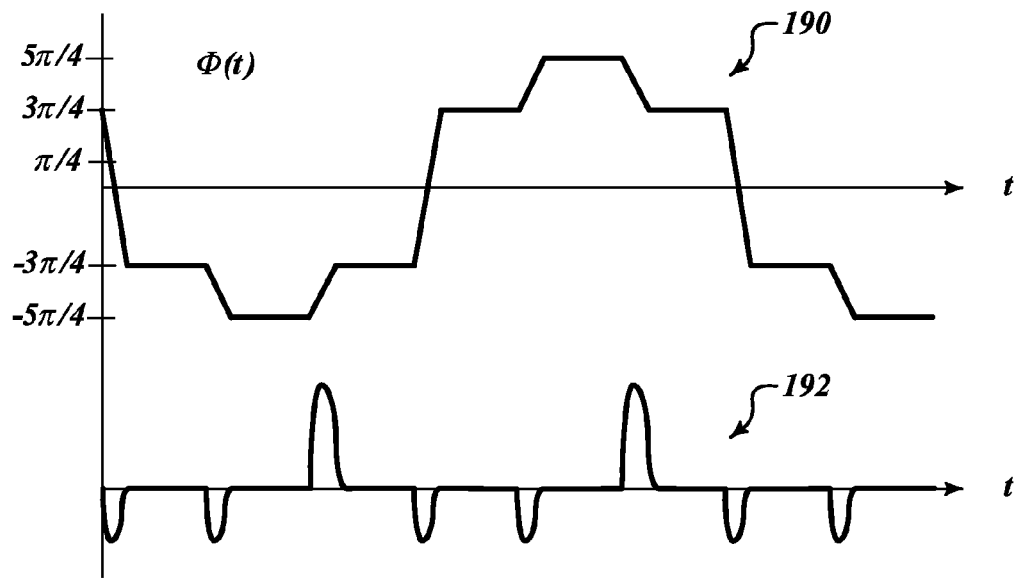
Figures 2, 4:
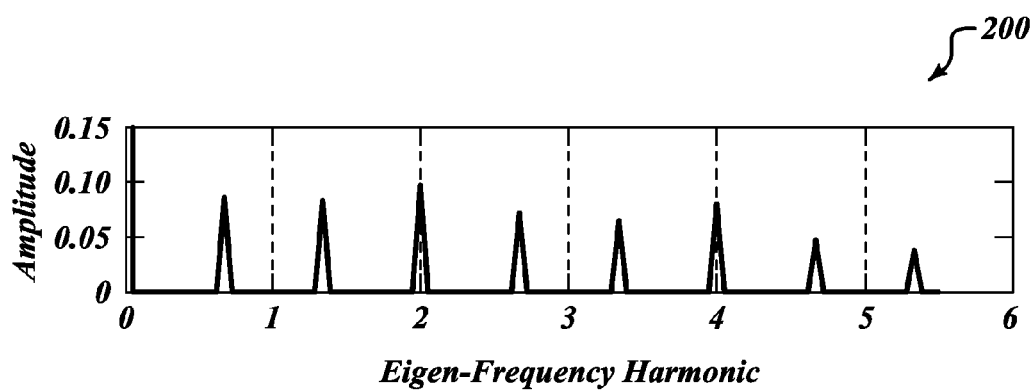

FIG. 4-1 illustrates an example bias modulation waveform 190 generated by the modulation module 130. Shown below the bias-modulation waveform 190 is a glitch pattern 192 experienced at the front-end electronics/modulation module 130. In order to servo $V_{pi}$, the bias waveform must have at least four states:

$\theta_m$, $2\pi - \theta_m$, $-\theta_m$, and $-2\pi + \theta_m$ (where $\theta_m$=the modulation depth). $\pi$ is the phase shift voltage value $V_{pi}$ at the IOC 142.

The Eigen-frequency odd harmonic content of the bias-modulation waveform is below that of both square-wave and dual-ramp modulation (prior art) over the modulation depth range of $\pi/3$ to $5\pi/6$, thereby reducing electrical coupling with other components.

In order to produce a benign glitch pattern, the pattern does not contain frequency content at the odd harmonics of the Eigen-frequency. Other modulation schemes can be used provided they have glitch patterns with little or zero harmonic component that coincides with a sense frequency component.

Figures 1, 2:
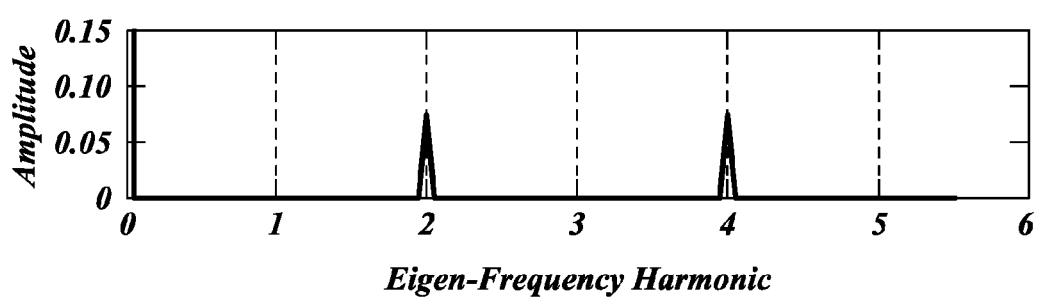

FIG. 4-2 illustrates a frequency content signal 200 of the glitch pattern 192. The frequency content signal 200 of the glitch pattern 192 has an Eigen-frequency harmonic that has zero amplitude at the odd harmonics which corresponds to the sense harmonics of the IFOG 100. The bias-modulation depth for the bias-modulation waveform 190 used to produce the results shown in FIG. 4-2 is $\pi/2$.

FIG. 5-3 shows a frequency content signal of the bias-modulation waveform 190 at a bias-modulation depth of $\pi/2$ that has a three times lower signal level at the odd harmonics than that in the prior art modulation schemes (FIGS. 5-1 and 5-2).

FIG. 6-3 shows a frequency content signal of the bias-modulation waveform 190 at a bias-modulation depth of $3\pi/4$ that has a nine times lower signal level at the odd harmonics than that in the Dual Ramp modulation scheme (FIG. 6-2) and a three times lower signal level at the odd harmonics than that in the Square-wave modulation scheme (FIG. 6-1). The results in FIGS. 5 and 6 indicate that the An example IFOG system that can be modified to execute the example bias-modulation waveform 190 or a modulation scheme that provides comparable benefits is shown and described in U.S. Pat. Ser. No. 7,167,250, which is hereby incorporated by reference.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An Interferometric Fiber Optic Gyro (IFOG) device having front-end components, the device comprising:
   a modulation component configured to generate a bias-modulation waveforms having at least four states, the at least four states including $\theta_m$, $2\pi - \theta_m$, $-\theta_m$, and $-2\pi + \theta_m$, where $\theta_m$=the modulation depth; and
   an integrated optics chip (IOC) configured to modulate one or more light signals passing thru according to the generated bias-modulation waveforms.

2. The device of claim 1, wherein the modulation component is further configured to servo modulation depth errors ($V_{pi}$).

3. The device of claim 1, wherein the modulation depth of the bias-modulation waveform ranges from $\pi/3$ to $5\pi/6$.

4. The device of claim 1, wherein a glitch pattern experienced at the front-end components has frequency content with approximately zero amplitude at predefined sense harmonics.

5. The device of claim 1, wherein Eigen-frequency odd harmonic content of the bias-modulation waveform is below a predefined threshold value at the predefined sense harmonics.

6. A method comprising:
   sending a light signal to an integrated optics chip (IOC) of an Interferometric Fiber Optic Gyro (IFOG) device having front-end components;
   modulating the light signals passing thru the IOC according to a bias-modulation waveform having at least four states, the at least four states including $\theta_m$, $2\pi - \theta_m$, and $-2\pi + \theta_m$, where $\theta_m$=the modulation depth;
   sensing the light signal after modulation and travel through a fiber coil; and
   generating an output signal based on the sensed light signal and the bias-modulation waveform,
   wherein a glitch pattern experienced at the front-end components has frequency content with approximately zero amplitude at predefined sense harmonics.

7. The method of claim 6, further comprising servoing modulation depth errors ($V_{pi}$).

8. The method of claim 6, wherein the modulation depth of the bias-modulation waveform ranges from $\pi/3$ to $5\pi/6$.

9. The method of claim 6, wherein a glitch pattern experienced at the front-end components has frequency content with approximately zero amplitude at predefined sense harmonics.

10. The method of claim 6, wherein Eigen-frequency odd harmonic content of the bias-modulation waveform is below a predefined threshold value at the predefined sense harmonics.

* * * * *

UNITED STATES PATENT AND TRADEMARK OFFICE
CERTIFICATE OF CORRECTION

| | |
|---|---|
| PATENT NO. | : 8,253,944 B2 |
| APPLICATION NO. | : 12/505718 |
| DATED | : August 28, 2012 |
| INVENTOR(S) | : Trinkle et al. |

It is certified that error appears in the above-identified patent and that said Letters Patent is hereby corrected as shown below:

At Claim 6, Column 4, Lines 36-37, replace "$\theta_m$, $2\pi-\theta_m$, and $-2\pi+\theta_m$" with --$\theta_m$, $2\pi-\theta_m$, $-\theta_m$, and $-2\pi+\theta_m$--

Signed and Sealed this

Thirteenth Day of November, 2012

David J. Kappos
*Director of the United States Patent and Trademark Office*